(12) United States Patent
Maegoya et al.

(10) Patent No.: US 7,461,635 B2
(45) Date of Patent: Dec. 9, 2008

(54) VERTICAL MULTI-CYLINDER DIESEL ENGINE

(75) Inventors: Akira Maegoya, Sakai (JP); Takatoshi Imai, Sakai (JP)

(73) Assignee: Kubota Corporation, Osaka (JP)

( * ) Notice: Subject to any disclaimer, the term of this patent is extended or adjusted under 35 U.S.C. 154(b) by 487 days.

(21) Appl. No.: 11/079,862

(22) Filed: Mar. 14, 2005

(65) Prior Publication Data

US 2005/0205066 A1 Sep. 22, 2005

(30) Foreign Application Priority Data

Mar. 19, 2004 (JP) ............................ P 2004-079675

(51) Int. Cl.
*F02M 69/46* (2006.01)
*F02M 35/10* (2006.01)

(52) U.S. Cl. .................. 123/456; 123/58.1; 123/468; 123/469; 123/184.21; 123/184.38

(58) Field of Classification Search ................. 123/456, 123/468, 469, 58.1, 294, 184.21, 184.38
See application file for complete search history.

(56) References Cited

U.S. PATENT DOCUMENTS

| | | | | |
|---|---|---|---|---|
| 1,282,571 A | * | 10/1918 | Guay | 123/90.31 |
| 5,950,586 A | * | 9/1999 | Ropertz | 123/184.42 |
| 5,964,199 A | * | 10/1999 | Atago et al. | 123/295 |
| 5,992,393 A | | 11/1999 | Yoshida et al. | |
| 5,996,543 A | * | 12/1999 | Nakayama et al. | 123/184.21 |
| 6,098,586 A | * | 8/2000 | Bloomer | 123/184.21 |
| 6,318,329 B1 | | 11/2001 | Sato | |
| 6,571,765 B2 | * | 6/2003 | Kuboshima et al. | 123/305 |
| 6,971,363 B2 | * | 12/2005 | Aketa et al. | 123/198 R |
| 2001/0029927 A1 | * | 10/2001 | Kato | 123/456 |
| 2002/0052157 A1 | | 5/2002 | Kato | |
| 2003/0037761 A1 | | 2/2003 | Katayama | |

FOREIGN PATENT DOCUMENTS

| | | |
|---|---|---|
| JP | 11-229991 A | 8/1999 |
| JP | 2001-159381 A | 6/2001 |
| JP | 2003-83079 A | 3/2003 |
| JP | 2003-161161 A | 6/2003 |

* cited by examiner

*Primary Examiner*—Stephen K Cronin
*Assistant Examiner*—J. Page Hufty
(74) *Attorney, Agent, or Firm*—Panitch Schwarze Belisario & Nadel LLP

(57) ABSTRACT

The present invention has an object to provide a vertical multi-cylinder diesel engine capable of conveniently protecting a common rail and its parts. On the assumption that a width direction of a cylinder block (2) is taken as a horizontal direction, when arranging the common rail (3) horizontally lateral of the cylinder block (2), there is disposed above the common rail (3) a passage forming means (23) which is the alternative of an intake air distributing means (5) and an exhaust air converging means (22). The passage forming means (23) above the common rail (3) may be formed into a box-shaped structure with no branch pipe. Further, an engine cooling fan (4) may be arranged in front of the common rail (3) so as to pass cooling air below the passage forming means (23) above the common rail (3).

10 Claims, 8 Drawing Sheets

VERTICAL MULTI-CYLINDER DIESEL ENGINE

BACKGROUND OF THE INVENTION

The present invention relates to a vertical multi-cylinder diesel engine.

Conventional multi-cylinder diesel engines may include a common rail (see Patent Public Disclosure No. 2001-159381).

Because the common rail is subjected to a large inner pressure while the engine is in operation, there is a need for preventing it from being broken or damaged. Further, since a pressure sensor or the like pads are attached to the common rail, it is also necessary to prohibit them from being damaged. However, conventionally, there has been no means for conveniently protecting the common rail and its parts.

The above-mentioned conventional technique has the following problem. The common rail and its pads are easily susceptible to damage. There is no means for easily protecting the common rail and its parts. Accordingly, when tools and parts fall inadvertently while conducing maintenance on the parts around the common rail, they collide against the common rail and its parts, thereby easily damaging the common rail and its parts.

BRIEF SUMMARY OF THE INVENTION

The present invention provides a vertical multi-cylinder diesel engine capable of solving the above-mentioned problem. More particularly, it aims at providing a vertical multi-cylinder diesel engine which can conveniently protect the common rail and its parts. As exemplified in FIGS. 1 to 3, on the assumption that a width direction of a cylinder block 2 is a horizontal direction, when arranging a common rail 3 laterally of the cylinder block 2 in the horizontal direction, there is disposed above the common rail 3 a passage forming means 23 which is either an intake air distributing means 5 or an exhaust air converging means 22.

It is possible to attempt to protect the common rail and its parts.

As exemplified in FIGS. 1 to 4, even if the tools, the parts and the like are made to fall inadvertently at the time of effecting maintenance for the parts around the common rail 3, these are received by the intake air distributing means 5 to prevent them from falling onto the common rail 3. This makes it possible to attempt to protect the common rail 3 and its parts (pressure sensor and the like).

It is possible to enforce the protection for the common rail.

As exemplified in FIG. 2, the intake air distributing means 5 above the common rail 3 is formed into a box-shaped structure without any branch pipe. Therefore, when compared with a structure having a likelihood that tools, parts and the like pass through the branch pipes, the passage forming means 23 more assuredly receives the tools and the parts even if they fall from above the common rail, which results in being able to enforce the protection for the common rail 3.

It is possible to prevent the overheat of the common rail.

As illustrated in FIGS. 1 to 4, an engine cooling fan 4 is arranged in front of the common rail 3 so as to pass the produced cooling air below the passage forming means 23 disposed above the common rail 3. Therefore, the common rail is cooled by the cooling air to result in the possibility of preventing the overheat of the common rail 3, which leads to an advantage of enhancing the durability of the common rail 3 and its parts (pressure sensor or the like).

It is possible to enhance the cooling efficiency of the common rail.

As illustrated in FIGS. 1, 3 and 4, a boss 6a projects downwardly from a lower wall 5a of the passage forming means 23 and horizontally crosses the lower wall 5a. Consequently, the cooling air which flows along the lower wall 5a of the passage forming means 23 is deflected downwardly by the boss 6a to collide against the common rail 3. This makes it possible to enhance the cooling efficiency of the common rail 3.

It is possible to enforce protection of the common rail.

As exemplified in FIGS. 1, 2 and 4, a projection 9a of a gear-train accommodation portion 9 is made to face a rear end portion of the common rail 3 from behind the rear end portion thereof. In consequence, during maintenance, the projection 9a of the gear-train accommodation portion 9 receives the tool and the like parts which approach from behind the common rail 3. This leads to the possibility of enforcing protection of the common rail 3.

It is possible to assure protection of the common rail.

As exemplified in FIGS. 1, 2 and 4, a pump 7 for the common rail 3 is made to oppose to the rear end portion of the common rail 3 from a horizontally outer side of the rear end portion thereof. Thus during the maintenance, the pump 7 of the common rail can receive the tools and the parts which approach from a horizontally lateral side of the engine. This results in the possibility of assuring the protection for the common rail 3.

It is possible to attempt to protect a pipe of the common rail.

As exemplified in FIG. 2, a surrounding portion 11c of an insertion port of an injector connection portion 13a of a side wall 11a on the side of the common rail 3 of a head cover 11 is more retreated toward an inner side of the head cover 11 than the other portions. Therefore, by that amount, a pipe 13 can come to be nearer the head cover 11. This results in the possibility of inhibiting the pipe 13 from projecting horizontally in an attempt to protect the pipe 13 of the common rail 3.

It is possible to attempt to protect an electronic control device.

As exemplified in FIG. 1, an electronic control device 14 for controlling an injection system of the common rail 3 is arranged below the passage forming means 23 disposed above the common rail 3. Accordingly, even if the tools, the parts and the like are made to fall inadvertently during the maintenance for the surrounding parts of the common rail 3, these are received by the passage forming means 23 without falling on the electronic control device 14. This makes it possible to attempt to protect the electronic control device 14.

The working efficiency of the maintenance is high.

As illustrated in FIG. 1, since the electronic control device 14 for controlling the injection system of the common rail 3 is arranged below the passage forming means 23 disposed above the common rail 3, it is possible to conduct the maintenance for the common rail 3 as well as for the electronic control device 14 that controls the injection system of the common rail, from a side where the common rail 3 is arranged. This leads to the possibility of enhancing the working efficiency of the maintenance.

It is possible to inhibit the enlargement of the engine.

As illustrated in FIGS. 1 and 2, an EGR cooler 15 is arranged behind a cylinder head 10 and above the gear-train accommodation portion 9. Thus the EGR cooler 15 can be accommodated in a place which originally becomes a dead space, without wasting the space to result in the possibility of preventing the engine from being enlarged.

It is possible to inhibit the enlargement of the engine.

As exemplified in FIGS. 1 and 2, since an EGR valve 16 is attached to an upper portion of the intake air distributing means 5, the EGR cooler 15 can be accommodated in the place which originally becomes the dead space, without wasting the space to result in the possibility of preventing the engine from being enlarged.

It is possible to make a horizontal width of the engine small.

As exemplified in FIGS. 1 and 2, a belt tensioner 18 of a belt transmission device 17 is arranged ahead of the pump 7 for the common rail 3. Thus when compared with a case where they are arranged horizontally, it is possible to make the horizontal width of the engine small.

It is possible to improve the working efficiency of the maintenance.

As exemplified in FIGS. 1 and 2, an generator 19 is made to serve as the belt tensioner 18. This results in arranging on the same side the generator 19 and the pump 7 for the common rail 3 which are frequently subjected to maintenance. This in turn can improve the working efficiency of the maintenance.

It is possible to enhance the working efficiency of the maintenance.

As exemplified in FIGS. 1 and 2, the pump 7 for the common rail 3 is arranged on the side where the common rail is present. Therefore, it is possible to carry out the maintenance for the common rail 3 and the pump 7 for the common rail 3 from the side where the common rail 3 is arranged. This results in the possibility of enhancing the working efficiency of the maintenance.

It is possible to reduce the horizontal width of the engine.

As exemplified in FIG. 1, the pump 7 for the common rail 3 is arranged on one horizontally lateral side of an upper side portion 2a of the cylinder block 2. Thus as shown in FIG. 2, the pump 7 for the common rail 3 which has a relatively large horizontal width can be accommodated without much trouble in a large accommodation space that does not project laterally in a horizontal direction. This results in the possibility of reducing the horizontal width of the engine.

It is possible to improve the working efficiency of the maintenance.

As illustrated in FIG. 1, an oil cooler 20 and a starter motor 21 are dividedly arranged in the front and rear direction on one horizontally lateral side at a vertically mid portion (2b) of the cylinder block 2 where the common rail 3 is present. This results in arranging on the same side the oil cooler 20, the starter motor 21 and the pump 7 for the common rail 3 which are frequently subjected to the maintenance, so as to improve the working efficiency of the maintenance.

It is possible to maintain the horizontal width small.

As exemplified in FIG. 1, since the oil cooler 20 and the starter motor 21 are dividedly arranged in the front and rear direction on the one horizontally lateral side of the vertically mid portion 2b of the cylinder block 2, the oil cooler 20 and the starter motor 21 each of which has a relatively small horizontal width can be arranged without much trouble in an accommodation space narrowed by a horizontal projection of a crank case 24 as shown in FIG. 2 and therefore the space can be effectively utilized to result in the possibility of maintaining the horizontal width small.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

An embodiment of the present invention is explained with reference to the drawings.

Any one of FIGS. 1 to 8 shows a vertical multi-cylinder diesel engine of common-rail type according to the embodiment of the present invention.

This engine is outlined as follows.

Figure 1:
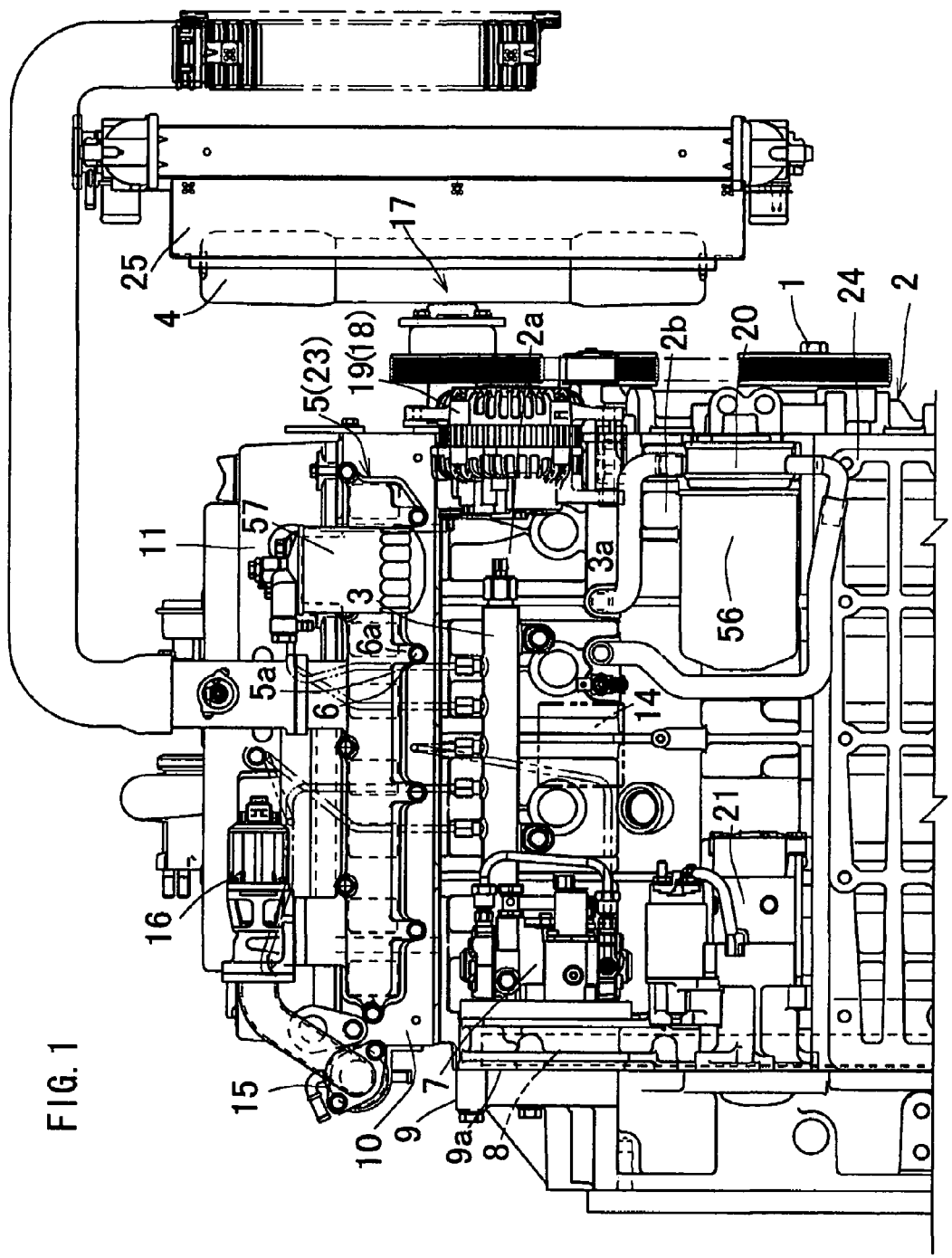
FIG. 1 is a left side view of a vertical multi-cylinder diesel engine of common-rail type according to an embodiment of the present invention.

A width direction of a cylinder block 2 or a cylinder head 10, an axial direction of a crank shaft 1 and an axial direction of a cylinder are taken as a horizontal direction, a front and rear direction and a vertical direction, respectively. As shown in FIG. 1, the cylinder block 2 has an upper portion to which the cylinder head 10 is assembled. The cylinder head 10 has an upper portion to which a head cover 11 is assembled. There are arranged a radiator 25 and an engine cooling fan 4 in front of the cylinder block 2. This engine cooling fan 4 is driven by the crank shaft 1 through a belt transmission device 17 arranged ahead of the cylinder block 2. Arranged at the back of the cylinder block 2 is a gear-train accommodation portion 9 which accommodates a gear train 8. As shown in FIG. 1, a common rail 3 is arranged on one of both horizontally lateral sides of the cylinder block 2. The common rail 3 spans in the front and rear direction. A pressure sensor 3a is arranged at a front end portion of the common rail 3 and a relief valve is disposed at a rear end portion thereof.

Figure 2:
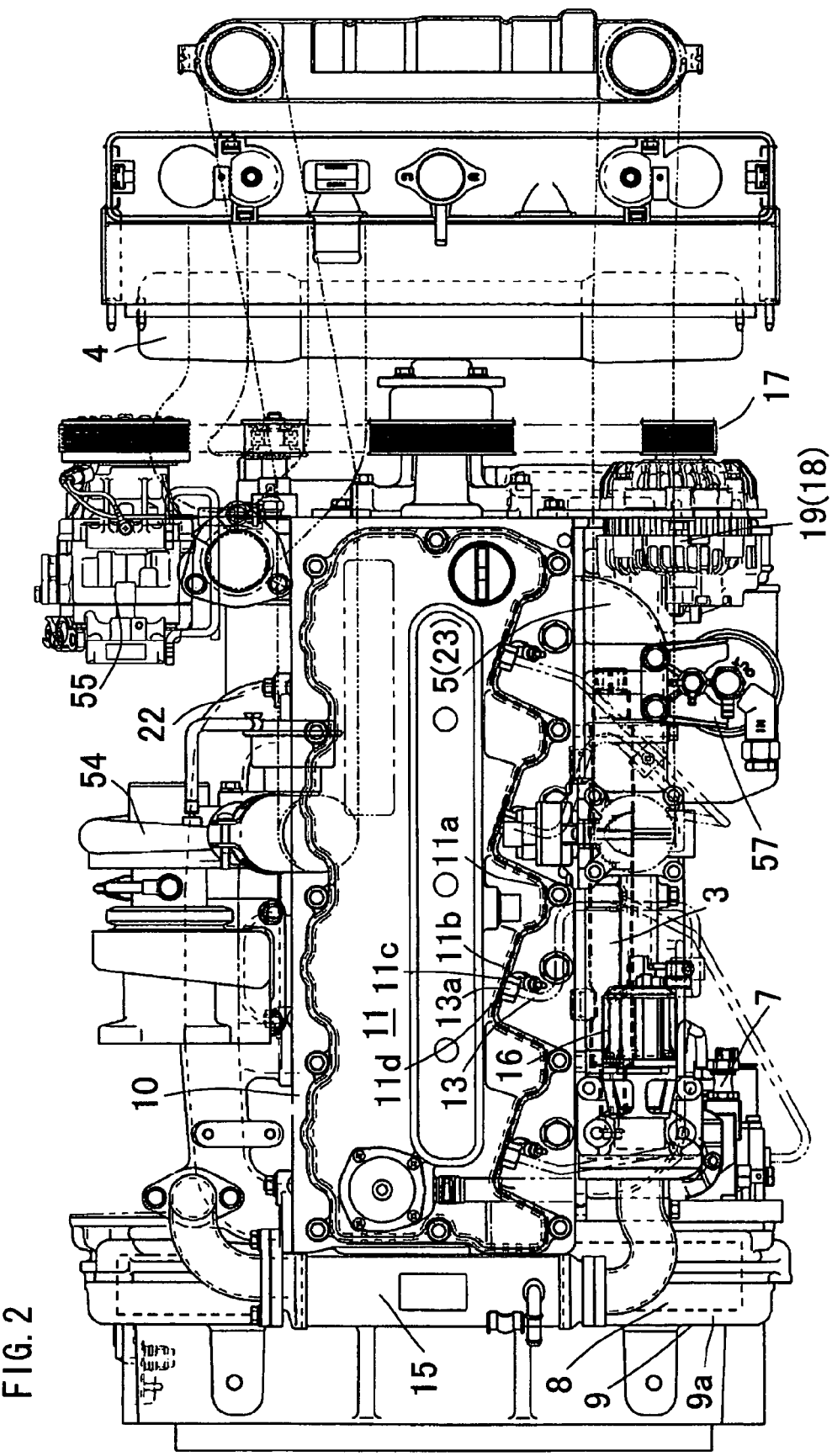
FIG. 2 is a plan view of the engine shown in FIG. 1.

As shown in FIGS. 1 and 2, when arranging the common rail 3 on the one horizontally lateral side, an intake air distributing means 5 is arranged above the common rail 3. Further, an exhaust air converging means 22 may be arranged above the common rail 3. More specifically, it is sufficient to arrange above the common rail 3 a passage forming means 23 which is either the intake air distributing means 5 or the exhaust air converging means 22. Although the intake air distributing means 5 serves as a conventional intake manifold, it is different from a conventional intake manifold in that the intake air distributing means 5 is formed in the shape of a box without any branch pipe. (See FIG. 2). The exhaust air converging means 22 serves as an exhaust manifold but such a name is employed to be consistent with the name of the intake air distributing means 5.

Figure 3:
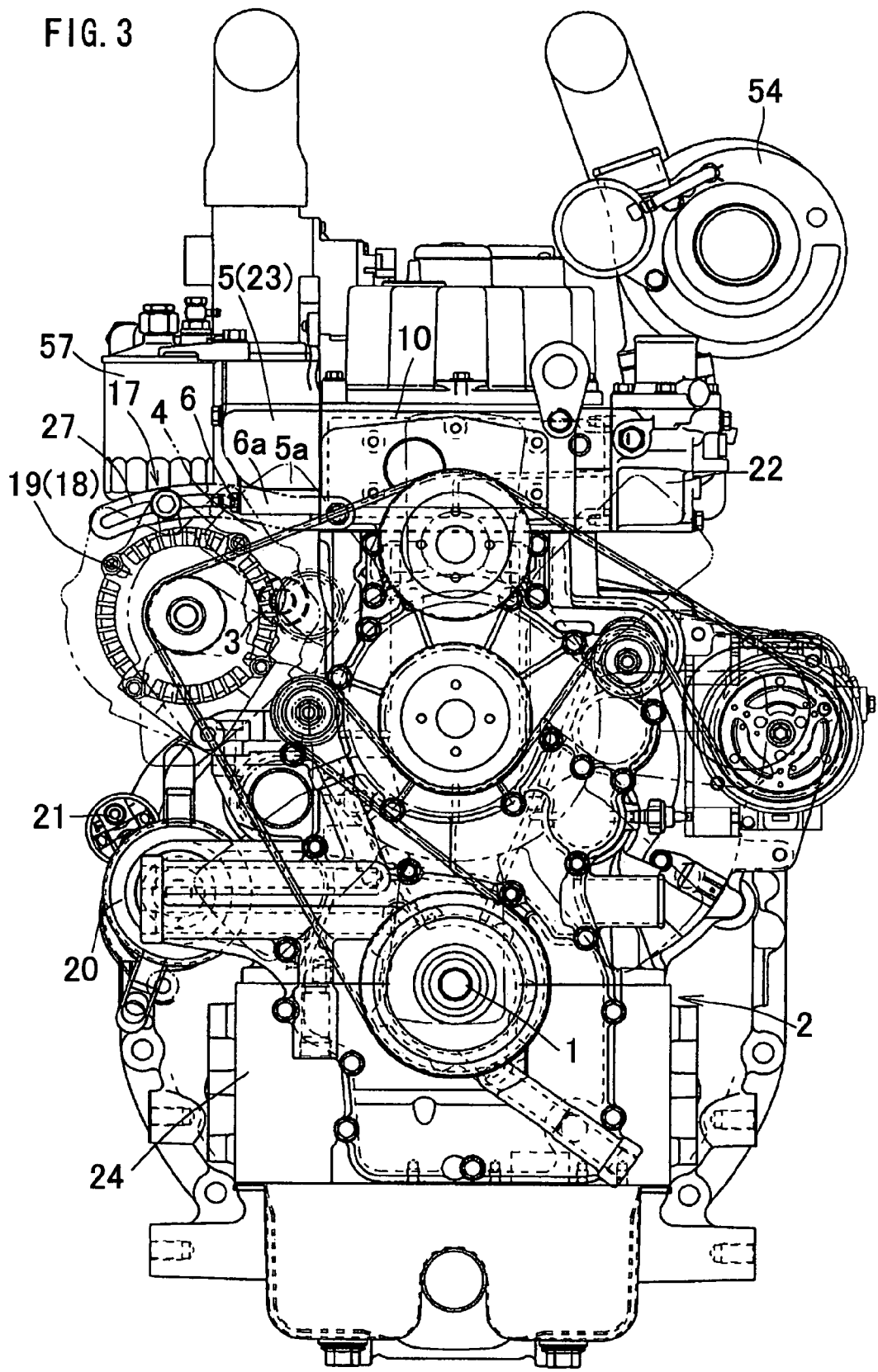
FIG. 3 is a front view of the engine shown in FIG. 1.

As shown in FIG. 1, the engine cooling fan 4 is arranged in front of the common rail 3 so as to make the cooling air produced by the engine cooling fan 4 pass below the passage forming means 23 disposed above the common rail 3. As shown in FIGS. 1 and 3, the passage forming means 23 above the common rail 3 has a lower wall 5a provided with a boss 6a for an attaching bolt 6. The boss 6a projects downwards from the lower wall Sa of the passage forming means 23 and horizontally crosses the same. As shown in FIG. 3, arranged ahead of the common rail 3 are a generator 19 which serves as a belt tensioner 18, and its stay 27, but the air to be fed rearwards by the engine cooling fan 4 passes through a gap between the generator 19 and the cylinder block 2 as well as above the stay 27 and then is supplied to below the passage forming means 23.

Figure 4:
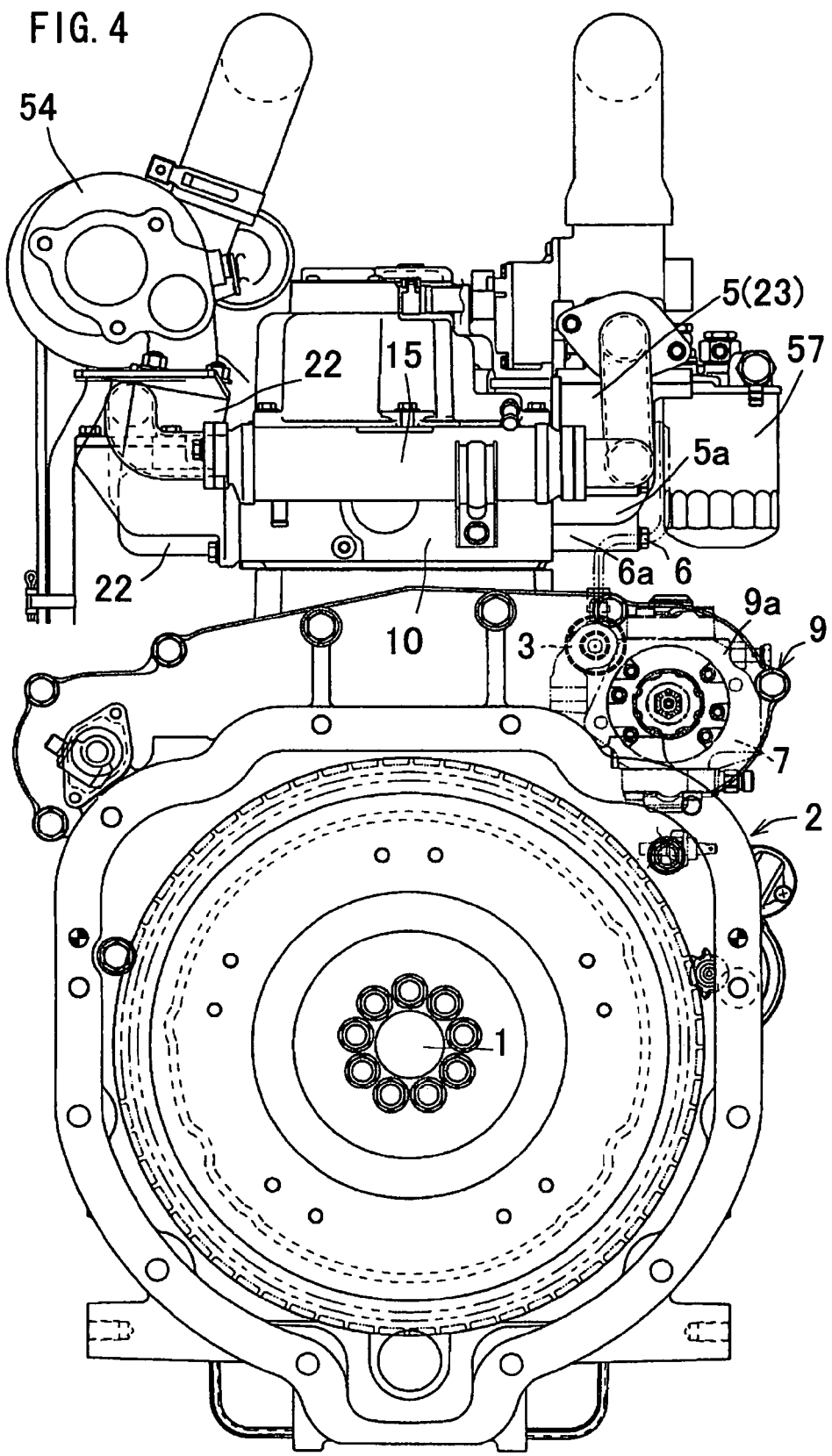
FIG. 4 is a rear view of the engine shown in FIG. 1.
Figure 5:
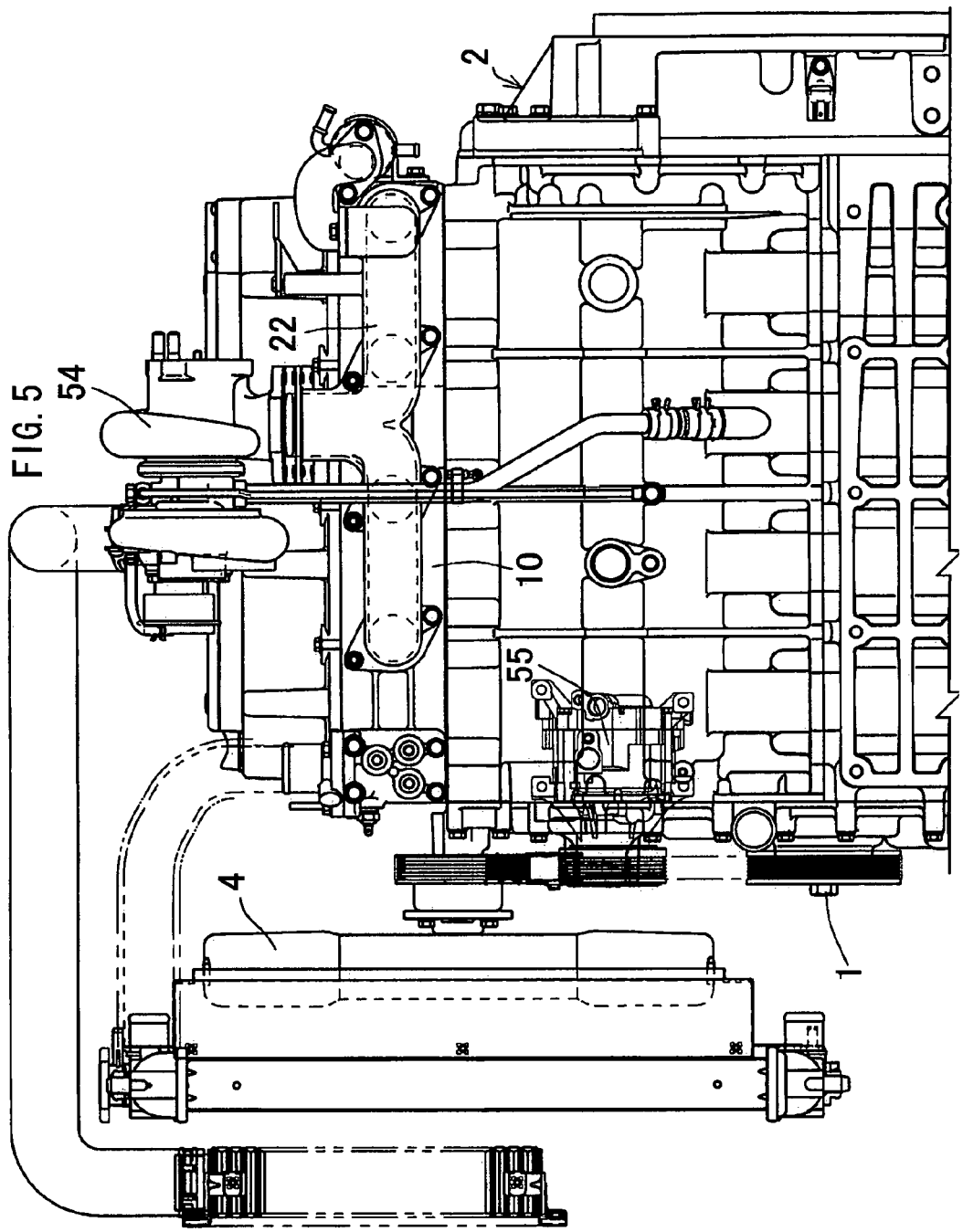
FIG. 5 is a right side view of the engine shown in FIG. 1.

As shown in FIGS. 1 and 2, the gear train 8 for interlockingly moving the pump 7 for the common rail 3 is arranged at a rear portion of the engine. The gear train 8 is accommodated in the gear-train accommodation portion 9. The gear-train accommodation portion 9 has a part which projects horizontally. This horizontal projection 9a has a front surface to which the pump 7 for the common rail 3 is attached. The projection 9a of the gear-train accommodation portion 9 faces a rear end portion of the common rail 3 from behind the latter. As shown in FIGS. 1, 2 and 4, the pump 7 for the common rail 3 opposes to the rear end portion of the common rail 3 from a horizontally outer side of the latter. This pump 7 is called as a fuel supply pump or a high-pressure pump.

Figure 7:
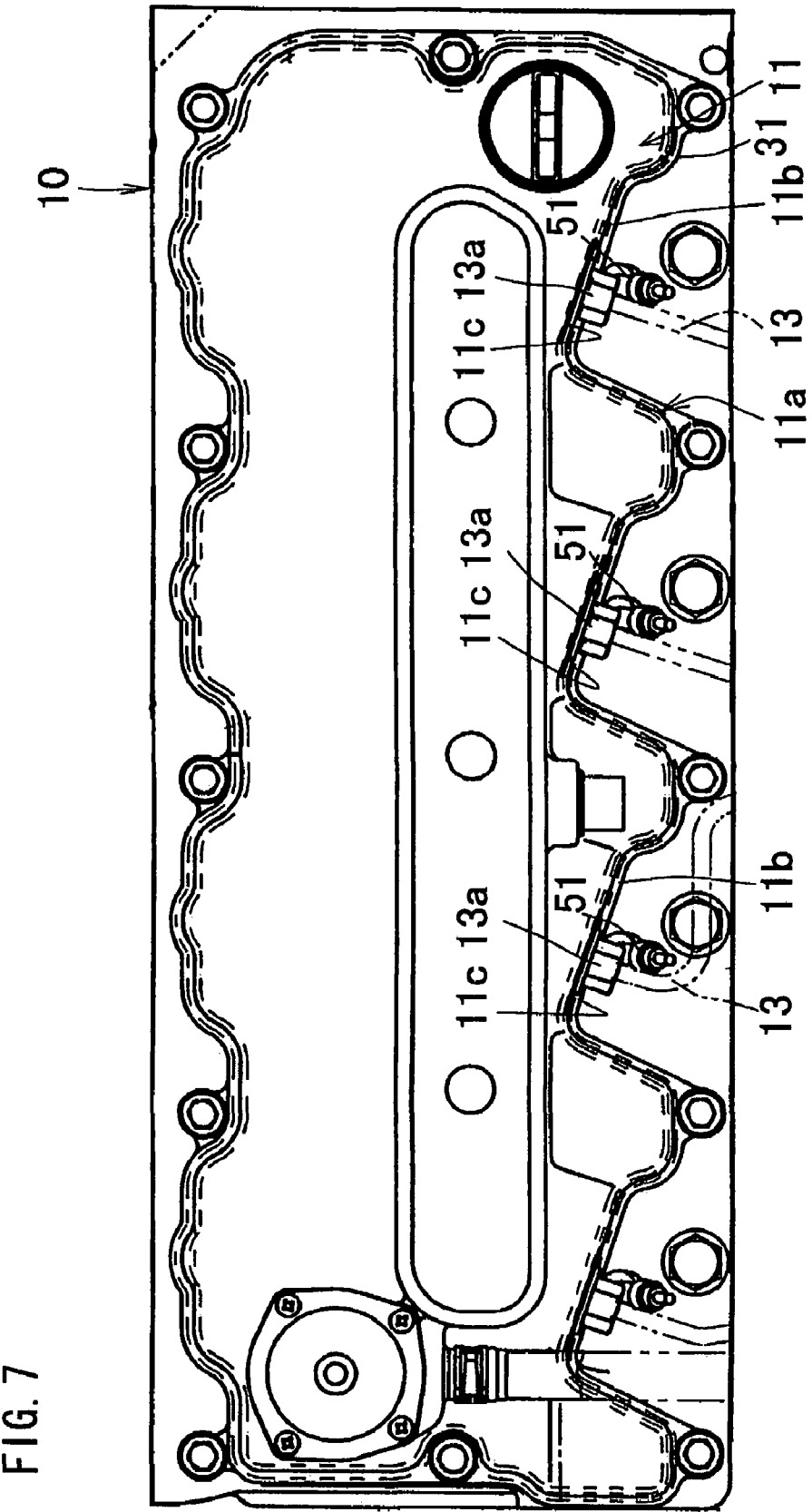
FIG. 7 is a plan view of the cylinder head with a head cover attached thereto, of the engine shown in FIG. 1.
Figure 8A:
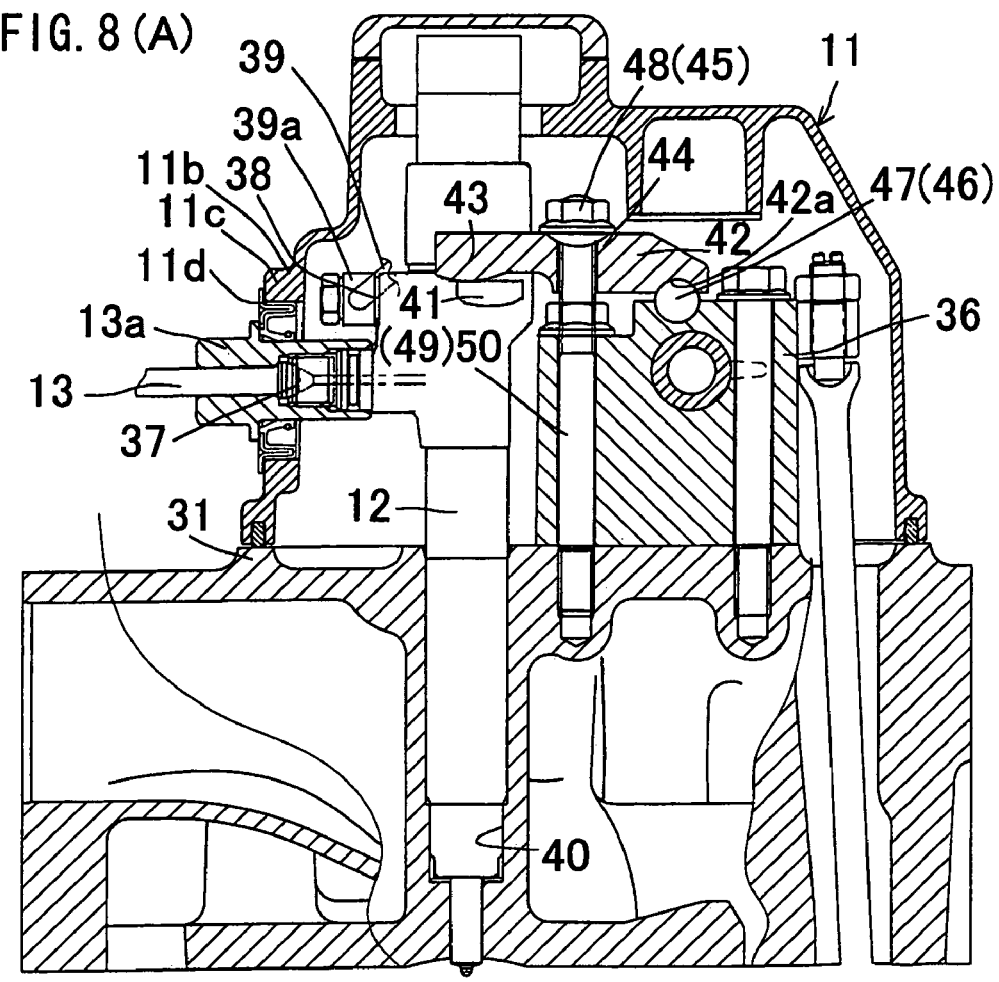
FIG. 8(A) is a vertical sectional view of a portion shown in FIG. 7
Figure 8B:
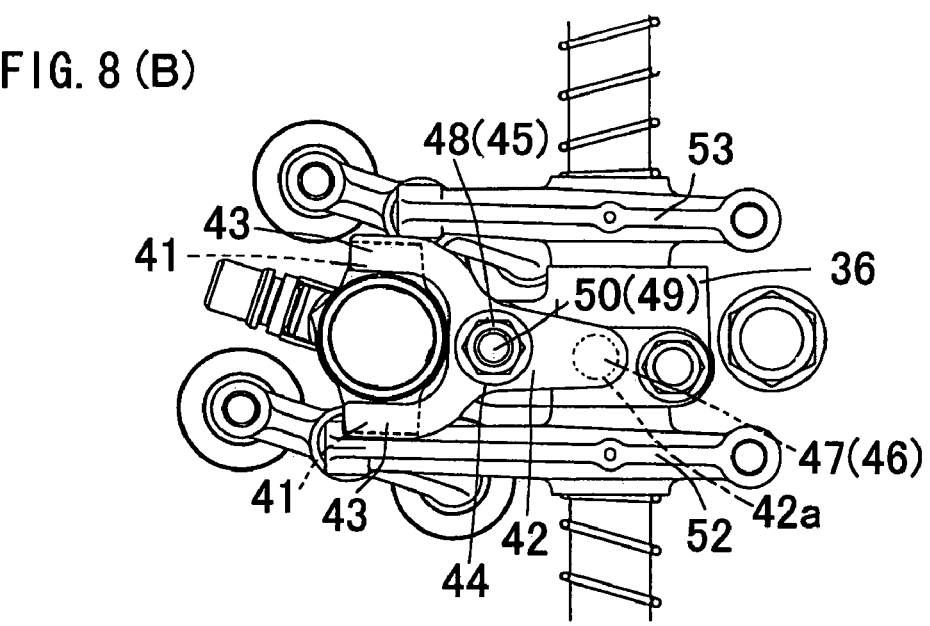
FIG. 8(B) is a plan view of a lever and its surroundings.

As shown in FIGS. 2, 7 and 8, the head cover 11 is attached to the cylinder head 10 and a pipe 13 is led out of the common rail 3 to an injector 12. A side wall 11a on the side of the common rail 3 of the head cover 11 is partly concaved more inwards than the other portions of the head cover 11. This concaved portion 11b of the side wall 11a has an inner portion 11c which is provided with an insertion port 11d. An injector connection portion 13a is inserted through the insertion port 1d and connects the pipe 13 to the injector 12 within the head cover 11.

As shown in FIG. 1, an electronic control device 14 for controlling an injection system of the common rail 3 is arranged below the intake air distributing means 5 disposed above the common rail 3. As shown in FIGS. 1 and 2, an EGR cooler 15 is arranged behind the cylinder head 10 and above the gear-train accommodation portion 9. As shown in FIG. 1, an EGR valve 16 is attached to an upper portion of the intake air distributing means 5. The EGR means "exhaust gas recirculation".

As shown in FIG. 1, the gear-train accommodation portion 9 has a part projected horizontally. This horizontal projection 9a has a front surface to which the pump 7 for the common rail 3 is attached. A belt tensioner 18 of the belt transmission device 17 is arranged in front of the pump 7. A generator 19 serves as the belt tensioner 18. The pump 7 for the common rail 3 is disposed horizontally lateral of an upper side portion 2a of the cylinder block 2 on the side where the common rail 3 is present. An oil cooler 20 and a starter motor 21 are arranged dividedly in the front and rear direction and laterally in the horizontal direction of the vertically mid portion of the cylinder block 2 on the side where the common rail 3 is present. The oil cooler 20 has a rear portion to which an oil filter 56 is detachably attached. A fuel filter 57 is attached to the intake air distributing means 5.

As shown in FIG. 2, a supercharger 54 is attached to an upper portion of the exhaust air converging means 22 on the horizontally lateral other side opposite to the one horizontally lateral side of the engine where the common rail 3 is arranged. Further, an air compressor 55 is disposed on this horizontally lateral other side.

Figure 6:
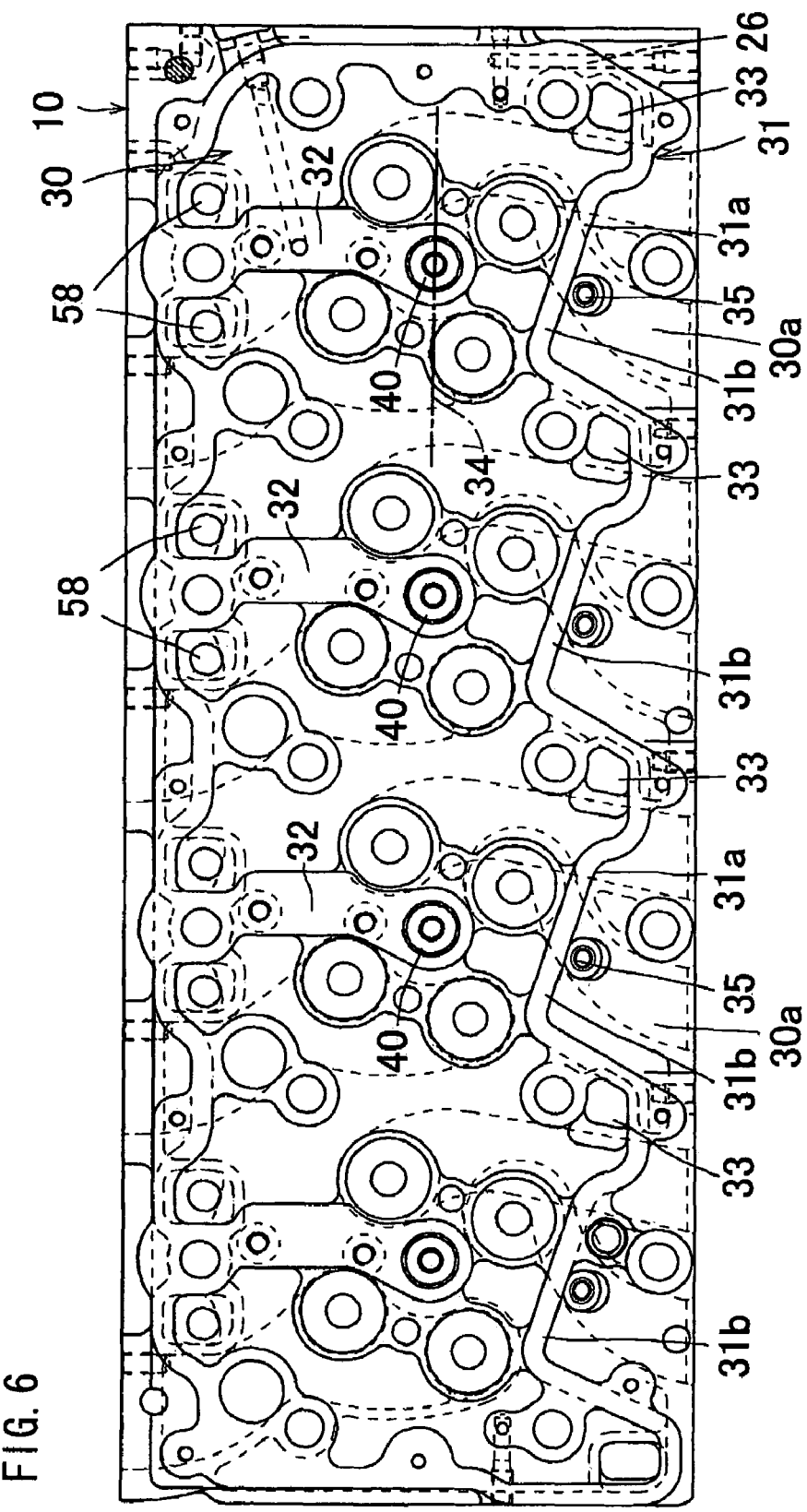
FIG. 6 is a plan view of a cylinder head of the engine shown in FIG. 1.

As shown in FIG. 6, the cylinder head 10 has an upper surface 30 raised upward to provide a head-cover attaching seat 31, onto which the head cover 11 is seated. The cylinder head 10 has the upper surface 30 surrounded by the head-cover attaching seat 31 to provide portions, which are formed with seats 32 for attaching rocker arm brackets and with oil drop holes 33.

The head-cover attaching seat 31 has a portion 31a positioned horizontally of the rocker arm bracket attaching seat 32. This portion 31a is more inwardly concaved toward the attaching seat 32 than the other portions of the head-cover attaching seat 31. When seen from above, this concaved portion 31a has an inner portion 31b formed so as to be inclined with respect to an axis 34 of the crank shaft 1. In the case where the engine is inclined to a side where the concaved portion 31a exists, the inner portion 31b of the concaved portion 31a is arranged so as to incline forwards downwardly. The thus downwardly inclined inner portion 31b has a downstream side where the oil drop hole 33 is arranged. The inner portion 31b of the concaved portion 31a may be adapted so as to incline rearwards downwardly. According to this arrangement, the oil on the upper surface 30 of the cylinder head 10 is promptly led to the oil drop hole 33 while being guided by the downwardly inclined portion 31b of the head-cover attaching seat 31 when the engine is horizontally inclined and is returned to an oil pan. As such the oil is prevented from staying still on the upper surface 30 of the cylinder head 10. Thus the oil deterioration is prevented by such a simple means as devising the shape of the head-cover attaching seat 31. A push-rod insertion hole 58 exists on the horizontally lateral other side opposite to the horizontally lateral one side where the oil drop hole 33 is present. Therefore, when the engine is inclined toward the horizontally lateral other side, oil is dropped through the push-rod insertion hole 58 to be returned to the oil pan.

As shown in FIG. 6, the cylinder head 10 has the upper surface 30 raised to provide the seat 31 for attaching the head cover 11. The attaching seat 31 is inwardly concaved to provide the portion 31a, which is further inwardly concaved to result in forming a horizontally outward extension surface 30a in which a hole 35 for inserting a glow plug 51 is provided. This construction enables the glow plug 51 to be attached and detached outside the head cover 11 without dismantling the head cover 11 as shown in FIG. 7. This facilitates the attaching and detaching work of the glow plug 51.

As shown in FIGS. 7 and 8, the side wall 11a of the head cover 11 has the Portion 11b, which is positioned horizontally of the rocker arm bracket 36, concaved more inwardly toward the rocker arm bracket 36 than the other portions of the side wall 11a of the head cover 11. This concaved portion 11b of the side wall 11a has the inner portion 11c which is provided with the insertion port 11d. The injector connection portion 13a is inserted through this insertion port 11d. This injector connection portion 13a connects the fuel supply pipe 13 to the injector 12 within the head cover 11. According to this construction, the injector connection portion 13a advances inwards of the head cover 11. Thus the fuel supply pipe 13 can project horizontally of the engine in a length reduced by that amount of inward advancement.

As shown in FIG. 8, the injector 12 and the rocker arm bracket 36 are arranged side by side in the horizontal direction. A peripheral side surface of the injector 12 is provided on one horizontally lateral side opposite to the side where the rocker arm bracket 36 is present, with a fuel inlet 37 and a fuel return outlet 38. The fuel inlet 37 is connected to the injector connection portion 13a of the fuel supply pipe 13 and the fuel return outlet 38 is connected to an injector connection portion 39a of the fuel return pipe 39. According to this construction, the injector connection portions 13a and 39a can be attached and detached without being interfered by the rocker arm bracket 36, and rocker arms 52 and 53. This facilitates the maintenance work. Further, the fuel inlet 37 and the fuel return outlet 38 are arranged on the one horizontally lateral side where the common rail 3 is disposed. This construction allows the maintenance to be conducted for the common rail 3 as well as for the injector connection portions 13a and 39 from the same side with the result of facilitating the maintenance work.

As shown in FIG. 8, the cylinder head 10 is provided with a hole 40 for attaching the injector 12. The injector 12 is inserted through the injector attaching hole 40. This injector 12 is provided on its both sides with a pair of pressure receiving portions 41, 41. A lever 42 is provided with a pair of action point portions 43, 43 with which the pair of pressure receiving portions 41, 41 are brought into butting contact. The lever 42 has a power point 44 pushed by a threaded member 45 to press and fix the injector 12 into the injector attaching hole 40. The power point 44 of the lever 42 butts against the threaded member 45 at the respective surfaces, which are formed spherically. A fulcrum portion 46 which projects from the lever 42 has a surface formed spherically as well. The fulcrum portion 46 of the lever 42 is composed of a spherical member 47 which is fitted into a recess portion 42a of the lever 42. The lever 42 is made of a sintered alloy and the spherical member 47 employs a steel ball. Owing to this construction, the lever 42 and the fulcrum portion 46 can be produced separately from each other to result in the possibility of employing the steel ball and the like existing parts for the spherical member 47, which in turn facilitates the production of the lever.

As shown in FIG. 8, the fulcrum portion 46 is placed on an upper surface of the rocker arm bracket 36. A nut 48 is employed for the threaded member 45 which pushes the power point 44 of the lever 42. Utilized for an externally threaded rod 49 which brings the nut 48 into screw-thread fitting relationship is an attaching bolt 50 of the rocker arm bracket 36. This construction enables one part to serve as the other with the result of being able to form a simple structure which has only a small number of parts.

As shown in FIG. 8, an engine comprises the cylinder head 10 to which the head cover 11 is detachably assembled. The injector 12 is attached to the injector attaching hole 40 of the cylinder head 10 positioned within the head cover 11. The injector 12 is provided with the fuel inlet 37 and the fuel return outlet 38. Fuel is supplied from a fuel tank to the fuel inlet 37 of the injector 12 through the pump 7 for the common rail 3, the common rail 3 and the fuel supply pipe 13 in the mentioned order. Part of the fuel supplied to the injector 12 is adapted to be returned from the fuel return outlet 38 to the fuel tank or the pump 7 for the common rail 3 through the fuel return pipe 39. This engine is constructed as follows.

When connecting the fuel supply pipe 13 to the fuel inlet 37 of the injector 12 and the fuel return pipe 39 to the fuel return outlet 38 of the injector 12, the fuel inlet 37 and the fuel return outlet 38 of the injector 12 are arranged within the head cover 11. The fuel supply pipe 13 has an outlet provided with the injector connection portion 13a. The head cover 11 has a wall provided with the insertion port 11d. The injector connection portion 13a inserted through the insertion port 11d is connected detachably to the fuel inlet 37 of the injector 12.

The fuel return pipe 39 is accommodated within the head cover 11. As shown in FIG. 6, an in-head fuel return passage 26 is formed within the cylinder head 10. The fuel return pipe 39 has the outlet connected to an inlet of the in-head fuel return passage 26. Therefore, in the case where the injector connection portion 13a is removed from the fuel inlet 37 of the injector 12 and is taken out of the head cover 11 through the insertion port 11d of the head cover 11, the head cover 11 can be dismantled from the cylinder head 10 without removing the injector 12 and the fuel return pipe 39. If constructed as such, the head cover 11 can be removed easily. The fuel return pipe 39 is provided at its mid way with a plurality of annular injector connection portions 39a, which are connected to the fuel return outlets 38 of the respective injectors 12 in an attempt to feed the overflowed fuel from the fuel return outlet 38 of every injector 12 to the in-head fuel return passage 26.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A vertical multi-cylinder diesel engine comprising:
   a cylinder block having a width taken between lateral sides of the cylinder block in a horizontal direction;
   a common rail positioned toward one of the lateral sides of the cylinder block;
   a passage forming means disposed over and spaced above the common rail so as to cover the common rail from above, the passage forming means being formed into a box-shaped structure with no branch pipe which projects in the horizontal direction from a lateral side surface of a cylinder head and extends along the horizontally lateral side surface thereof and having a width and length greater than that of the common rail and being generally vertically in line with the common rail;
   a crank shaft spanning between a front and rear of the engine;
   an engine cooling fan arranged at the front of the engine in front of the common rail, the engine cooling fan moving cooling air between the common rail and the passage forming means;
   a gear train interlockingly operating a pump for the common rail and arranged at the rear of the engine, the gear train being accommodated in a gear-train accommodation portion part of which horizontally projects, the horizontal projection portion having a front surface to which the pump for the common rail is attached, the front surface of the horizontal projection having a portion closer to the cylinder block than a portion for attaching the pump for the common rail, which faces a rear end portion of the common rail from behind the common rail; and
   the common rail having, at an end portion of the common rail from a rear end portion, both horizontally lateral sides, one of which is opposite to the cylinder block side, the pump for the common rail being disposed on the opposite side and opposing to the rear end portion of the common rail from a horizontally lateral side of the common rail.

2. The vertical multi-cylinder diesel engine of claim 1 wherein the passage forming means has a lower wall provided with a boss, the boss projecting downwardly of the passage forming means and crossing the lower wall horizontally.

3. The vertical multi-cylinder diesel engine of claim 1, wherein a head cover is assembled to a cylinder head and a pipe leads from the common rail to an injector, the head cover having a side wall on one side where the common rail is present, part of the side wall being more inwardly concave than the other portions of the head cover to provide a concave portion, the concave portion having an inner portion provided with an insertion port, through which an injector connection portion is inserted, the injector connection portion connecting the pipe to the injector within the head cover.

4. The vertical multi-cylinder diesel engine of claim 1, wherein an electronic control device which controls an injection system of the common rail is arranged below the intake air distribution passage forming means disposed above the common rail.

5. The vertical multi-cylinder diesel engine of claim 1, wherein an EGR cooler is arranged behind the cylinder head and above a gear-train accommodation portion.

6. The vertical multi-cylinder diesel engine of claim 5, wherein an EGR valve is attached to an upper portion of the intake air distributing passage forming means.

7. The vertical multi-cylinder diesel engine of claim 1, wherein a belt transmission device is arranged in front of the engine and a gear train which interlockingly operates a pump for the common rail and is disposed at the back of the engine, the gear train being accommodated within a gear-train accommodation portion part of which projects horizontally, the horizontal projection having a front surface to which the pump for the common rail is attached, a belt tensioner of the belt transmission device being positioned in front of the pump.

8. The vertical multi-cylinder diesel engine of claim 7, wherein a generator also serves as the belt tensioner.

9. The vertical multi-cylinder diesel engine of claim 7, wherein the pump for the common rail is arranged horizontally lateral of an upper side portion of the cylinder block on the lateral side where the common rail is present.

10. The vertical multi-cylinder diesel engine of claim 9, wherein an oil cooler is arranged proximate the front of the engine and a starter motor is arranged proximate the rear of the engine and the oil cooler and starter motor are positioned horizontally lateral of a vertically mid portion of the cylinder block on the lateral side where the common rail is present.

* * * * *